United States Patent [19]

Yahagi

[11] Patent Number: 4,683,928
[45] Date of Patent: Aug. 4, 1987

[54] PNEUMATIC TIRE TREAD WITH A CENTRAL ZONE AND LATERAL ZONES OF DIFFERENT HARDNESS

[75] Inventor: Mitsuhisa Yahagi, Sayama, Japan

[73] Assignee: Bridgestone Corporation, Tokyo, Japan

[21] Appl. No.: 810,458

[22] Filed: Dec. 18, 1985

[30] Foreign Application Priority Data

Dec. 27, 1984 [JP] Japan .................. 59-196213

[51] Int. Cl.$^4$ .................. B60C 1/00; B60C 11/00
[52] U.S. Cl. .................. 152/209 R
[58] Field of Search .................. 152/209

[56] References Cited

U.S. PATENT DOCUMENTS

| | | | |
|---|---|---|---|
| 1,664,352 | 3/1928 | Coleman | 152/209 R |
| 2,130,524 | 9/1938 | Clark | 152/209 R |
| 2,224,141 | 12/1940 | Clark | 152/209 R |
| 3,364,965 | 1/1968 | Oubridge | 152/209 R |
| 4,319,620 | 3/1982 | Knill | 152/209 R |
| 4,385,653 | 5/1983 | Okazaki et al. | 152/209 R |

Primary Examiner—Michael Ball
Attorney, Agent, or Firm—Sughrue, Mion, Zinn Macpeak & Seas

[57] ABSTRACT

Pneumatic tires, particularly tires for heavy load vehicles are disclosed. In the tire of this type, the tread rubber is divided into three rubber portions of central and either side regions in the direction of rotational aixs of the tire. As the material of the tread rubber, the central region uses a rubber having a good cut resistance, while the either side region uses a rubber having a good wear resistance.

3 Claims, 5 Drawing Figures

PNEUMATIC TIRE TREAD WITH A CENTRAL ZONE AND LATERAL ZONES OF DIFFERENT HARDNESS

BACKGROUND OF THE INVENTION

1. Field of the Invention

This invention relates to a pneumatic tire, and more particularly to an improvement of a tread rubber structure suitable for use in a pneumatic tire for heavy load vehicles such as trucks, and buses and the like mainly running on both good and bad road surfaces.

2. Related Art Statement

In the conventional pneumatic tire, the tread rubber is composed of a single rubber layer or two different rubber layers laminated one upon the other in radial direction of a so-called cap and base structure. However, when such a pneumatic tire is used on a running road including a fairly high ratio of each of both good and bad surface, the appearance (number of injuries on tread surface) and wear resistance of the tire can not simultaneously be maintained at higher level because there is caused a large difference in the appearance between the central region and the either side region of the tread. Also, the wearing state of the tread becomes ununiform. That is, when the tire is run on the above road for a long period of time, the appearance of the central region of the tread is considerably degraded as compared with that of the either side region, while the wear resistance of the either side region is considerably poorer than that of the central region.

SUMMARY OF THE INVENTION

It is, therefore, an object of the invention to solve the aforementioned problems of conventional tires and to provide a pneumatic tire for use on both good and bad roads having good and uniform appearance and wear resistance over the entire tread width.

The cause of making the appearance and wearing states of the tread ununiform, are mainly cut failure by a foreign matter such as stones and the like scattering on a bad road surface and wear in case of running on a good road surface. Since the ground contact pressure of the central region of the tread is higher than that of the either side region thereof, when the tire is run on a bad road, the central region of the tread is apt to be subjected to cut failure as compared with the either side region, resulting in the degradation of the appearance. On the other hand, when the tire is run on a good road surface, the either side region of the tread prematurely wears as compared with the central region from a viewpoint of the relation of ground contact pressure between the central region and the either side region. With the foregoing in mind, the inventor has found that the above problem can be solved when the function of the tread rubber is effectively separated in every region in the widthwise direction of the tread.

According to the invention, there is the provision of a pneumatic tire comprising a tread rubber and a tread reinforcing layer superimposed about a crown portion of a carcass extending between a pair of bead portions; said tread rubber being divided into three rubber portions of central and either side regions in the direction of rotational axis of the tire; and said rubber portion of the central region being composed of rubber having a cut resistance higher than that of the either side region and said rubber portion of the either side region being composed of rubber having a wear resistance higher than that of the central region.

In the preferred embodiment of the invention, the JIS hardness of the rubber at the central region is higher than that at the either side region, while the strength at break of the rubber at the either side region is higher than that at the central region. In this connection, the JIS hardness is 63 to 67 at the central region and 58 to 62 at the either side region, respectively, while the strength at break is 240 to 280 kg/cm$^2$ at the central region and 280 to 320 kg/cm$^2$ at the either side region, respectively.

BRIEF DESCRIPTION OF THE DRAWINGS

The invention will be described with reference to the accompanying drawings, wherein.

DESCRIPTION OF THE PREFERRED EMBODIMENTS

As previously mentioned, since the ground contact pressure is higher at the central region of the tread than at the either side region thereof, the cut failure at the central region comes into question during the running on bad road, while the wearing at the either side region comes into question during the running on good road. In this connection, according to the invention, rubber having a higher cut resistance is disposed in the central region of the tread and rubber having a higher wear resistance is disposed in the either side region, whereby the cut resistance and wear resistance can simultaneously be improved over a whole of the tread as compared with the conventional tire.

Figure 1:
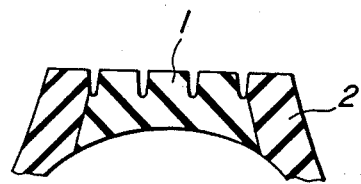
FIGS. 1 to 4 are partial section views of various embodiments of the tread in the pneumatic tire for heavy load vehicles according to the invention, respectively.

In FIG. 1 is sectionally shown a first embodiment of the pneumatic tire for heavy load vehicles according to the invention, wherein the tread is divided into five ribs by four circumferential grooves. In this figure, numeral 1 represents a central region of the tread and numeral 2 represents either side region of the tread. A rubber having good cut resistance, high hardness and low strength at break is used in the central region 1, while a rubber having good wear resistance, low hardness and high strength at break is used in either side region 2.

Figure 2:
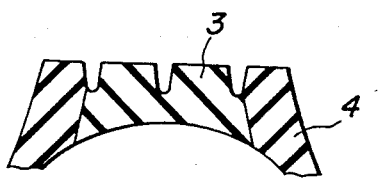
Figure 3:
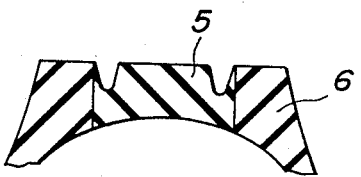

Second and third embodiments of the invention are sectionally shown in FIGS. 2 and 3, respectively. In the second embodiment of FIG. 2, the tread is divided into four ribs by three circumferential grooves, while in the third embodiment of FIG. 3, the tread is divided into three ribs by two circumferential grooves. In these figures, numerals 3 and 5 represent a central region of the tread and numerals 4 and 6 either side region thereof. Likewise the case of FIG. 1, such a central region 3 or 5 uses a rubber having a good cut resistance, high hardness and low strength at break, while the either side region 4 or 6 uses a rubber having good wear resistance, low hardness and high strength at break.

Figure 5:
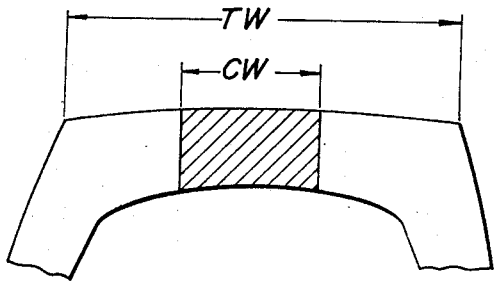
FIG. 5 is a schematically sectional view illustrating widths of central region and tread in the pneumatic tire according to the invention.

As shown in FIG. 5, the width of the central region of the tread (CW) is within a range of 10-70%, preferably 15-65% with respect to the ground contact width of the tread (TW).

As a result of experiments on the hardness and strength at break of the tread rubber, when the rubber portion of the central region has a JIS hardness of less than 63 or a strength at break of more than 280 kg/cm$^2$, the appearance is damaged considerably during the running on bad road. Inversely, when the JIS hardness is more than 67 or the strength at break is less than 240 kg/cm$^2$, the wearing is remarkably promoted during the running on good road.

On the other hand, when the rubber portion of the either side region has a JIS hardness of less than 58 or a strength at break of more than 320 kg/cm$^2$, the appearance is considerably degraded during the running on bad road, while when the JIS hardness is more than 62 or the strength at break is less than 280 kg/cm$^2$, the wearing is remarkably promoted during the running on good road.

From the above experimental results, it has been confirmed that as the tread rubber suitable for use on both good and bad roads, the rubber used in the central region of the tread has a JIS hardness of 63-67 and a strength at break of 240-280 kg/cm$^2$ and the rubber used in the either side region of the tread has a JIS hardness of 58-62 and a strength at break of 280-320 kg/cm$^2$.

Figure 4:
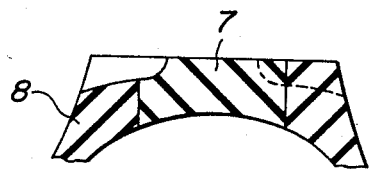

In FIG. 4 is sectionally shown a fourth embodiment of the pneumatic tire for heavy load vehicles according to the invention, wherein the tread is provided on both sides with plural lugs in the circumferential direction of the tire. In this case, a central region 7 of the tread uses a rubber having a good cut resistance, a high hardness and a low strength at break, and either side region 8 uses a good wear resistance, a low hardness and a high strength at break likewise the cases of FIGS. 1 to 3.

The invention is favorably applied to pneumatic tires for heavy load vehicles, particularly truck, bus and trailer. Further, according to the invention, tread patterns of various types such as rib type, block type, lug type and combinations thereof may be adopted favorably.

As mentioned above, according to the invention, the optimum materials of rubber as a tread rubber are selected and combined in accordance with the functions of central and either side regions of the tread, whereby the appearance and wear resistance of the tread can uniformly be maintained at a higher level even when the tire is run on both good and bad road surfaces for a long period of time. Therefore, it makes possible to provide pneumatic tires having excellent economy and fashionableness to tire users.

What is claimed is:

1. A pneumatic tire for heavy load vehicles comprising; a tread rubber and a tread reinforcing layer superimposed about a crown portion of a carcass extending between a pair of bead portions; said tread rubber being divided into three rubber portions of central and either side regions in the direction of rotational axis of the tire; and said rubber portion of the central region being composed having a cut resistance higher than that of the either side region a JIS hardness of 63-67 and a strength at break of 240-280 kg/cm$^2$ and said rubber portion of the either side region being composed of rubber having a wear resistance higher than that of the central region, a JIS hardness of 58-62 and a strength at break of 280-320 kg/cm$^2$.

2. The pneumatic tire according to claim 1, wherein said rubber portion of the central region has a JIS hardness higher than that of the either side region, and said rubber portion of the either side region has a strength at break higher than that of the central region.

3. The pneumatic tire according to claim 1, wherein said central region has a width corresponding to 10-70% of the tread width.

* * * * *